(12) United States Patent
Dash et al.

(10) Patent No.: US 10,362,062 B1
(45) Date of Patent: Jul. 23, 2019

(54) SYSTEM AND METHOD FOR EVALUATING SECURITY ENTITIES IN A COMPUTING ENVIRONMENT

(71) Applicant: Awake Networks, Inc., Mountain View, CA (US)

(72) Inventors: Debabrata Dash, San Jose, CA (US); Chunsheng Victor Fang, Redwood City, CA (US); Gary Golomb, Los Gatos, CA (US)

(73) Assignee: Awake Security, Inc., Sunnyvale, CA (US)

( * ) Notice: Subject to any disclaimer, the term of this patent is extended or adjusted under 35 U.S.C. 154(b) by 277 days.

(21) Appl. No.: 15/136,862

(22) Filed: Apr. 22, 2016

(51) Int. Cl.
H04L 29/06 (2006.01)

(52) U.S. Cl.
CPC .......... H04L 63/20 (2013.01); H04L 63/1408 (2013.01)

(58) Field of Classification Search
CPC ..... H04L 63/02; H04L 63/20; H04L 63/1408; H04L 63/1416; H04L 63/1441; H04L 63/1425
See application file for complete search history.

(56) References Cited

U.S. PATENT DOCUMENTS

| | | | | |
|---|---|---|---|---|
| 7,712,134 B1* | 5/2010 | Nucci | ................... | H04L 63/145 713/172 |
| 7,873,046 B1* | 1/2011 | Seshadri | ................. | H04L 63/14 370/229 |
| 9,038,178 B1* | 5/2015 | Lin | ..................... | H04L 63/1416 709/224 |
| 2003/0145232 A1* | 7/2003 | Poletto et al. | ................. | 713/201 |
| 2009/0138592 A1* | 5/2009 | Overcash | ............ | H04L 63/1425 709/224 |
| 2012/0173710 A1* | 7/2012 | Rodriguez | ............ | H04L 43/026 709/224 |
| 2015/0101053 A1* | 4/2015 | Sipple | ................. | H04L 63/1425 726/24 |
| 2016/0173525 A1* | 6/2016 | Thomas | .............. | H04L 63/1408 726/23 |
| 2016/0226901 A1* | 8/2016 | Baikalov | ............. | H04L 63/1425 |

\* cited by examiner

*Primary Examiner* — Hee K Song
(74) *Attorney, Agent, or Firm* — Minisandram Law Firm; Raghunath S. Minisandram (57) ABSTRACT

System and method to evaluate a plurality of security entities in a network environment is disclosed. Communication between a user computer and a destination computer is monitored by a security appliance. Selective information from the communication is extracted by the security appliance. The selective information is indicative of a value for one or more attributes of the plurality of security entities. A first value indicative of occurrence of each of the values for each of the attributes is generated. A second value indicative of occurrence of each of the values for each of the attributes for each of the security entity is generated. A third value is calculated based on the first value and the second value for each of the attribute value for each of the security entity, wherein the third value is indicative of significance of the value of the attribute for the security entity.

16 Claims, 9 Drawing Sheets

| SECURITY ENTITY | F1=G | F1=H | F2=J | F2=K |
|---|---|---|---|---|
| E5 | 77 | 0 | 3 | 9 |
| E6 | 0 | 5 | 6 | 10 |
| E7 | 1 | 5 | 6 | 10 |

FIGURE 5A

| SECURITY ENTITY | E5 | E6 | E7 |
|---|---|---|---|
| E5 |  | 28 | 106 |
| E6 |  |  | 42 |
| E7 |  |  |  |

FIGURE 5B

| SECURITY ENTITY | MOST SIMILAR | SECOND MOST SIMILAR |
|---|---|---|
| E5 | E7 | E6 |
| E6 | E7 | E5 |
| E7 | E5 | E6 |

SYSTEM AND METHOD FOR EVALUATING SECURITY ENTITIES IN A COMPUTING ENVIRONMENT

TECHNICAL FIELD

The present invention relates generally to evaluating security entities in a computing environment and, more particularly, based on the evaluation, selecting one or more security entities for further investigation.

DESCRIPTION OF RELATED ART

In the present day computing environment, an enterprise has to deal with monitoring and tracking enormous amount of activities occurring between various computing devices. Computing environment may include various security entities. A security entity may be a person, an application or a computing device whose behavior needs to be understood by a network administrator to maintain integrity of the network environment. In some examples, indication of certain behavior may warrant further analysis of the security entity. In some examples, further analysis may indicate a possible anomalous behavior.

In order to conduct a focused analysis of one or more security entities, there is a need to evaluate and characterize behavior of the security entities. As the number of security entities and number of transactions over a computing environment increases, selectively identifying one or more security entities for further analysis becomes challenging. In some examples, timely detection and selection may potentially avoid an impact to the enterprise based upon a timely corrective action. It is with these needs in mind, this disclosure arises.

SUMMARY OF THE INVENTION

In one embodiment, a method for evaluating a plurality of security entities in a network environment is disclosed. Communication between a user computer and a destination computer is monitored by a security appliance. Selective information from the communication is extracted by the security appliance. The selective information is indicative of a value for one or more attributes of the plurality of security entities. A first value indicative of occurrence of each of the values for each of the attributes is generated. A second value indicative of occurrence of each of the values for each of the attributes for each of the security entity is generated. A third value is calculated based on the first value and the second value for each of the attribute value for each of the security entity, wherein the third value is indicative of significance of the value of the attribute for the security entity.

In yet another embodiment, a system to evaluate a plurality of security entities in a network environment is disclosed. Communication between a user computer and a destination computer is monitored by a security appliance. Selective information from the communication is extracted by the security appliance. The selective information is indicative of a value for one or more attributes of the plurality of security entities. A first value indicative of occurrence of each of the values for each of the attributes is generated. A second value indicative of occurrence of each of the values for each of the attributes for each of the security entity is generated. A third value is calculated based on the first value and the second value for each of the attribute value for each of the security entity, wherein the third value is indicative of significance of the value of the attribute for the security entity.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for evaluating security entities in a computing environment. Referring now to the drawings, where similar reference characters denote corresponding features consistently throughout the figures, various examples of this disclosure is described.

Figure 1:
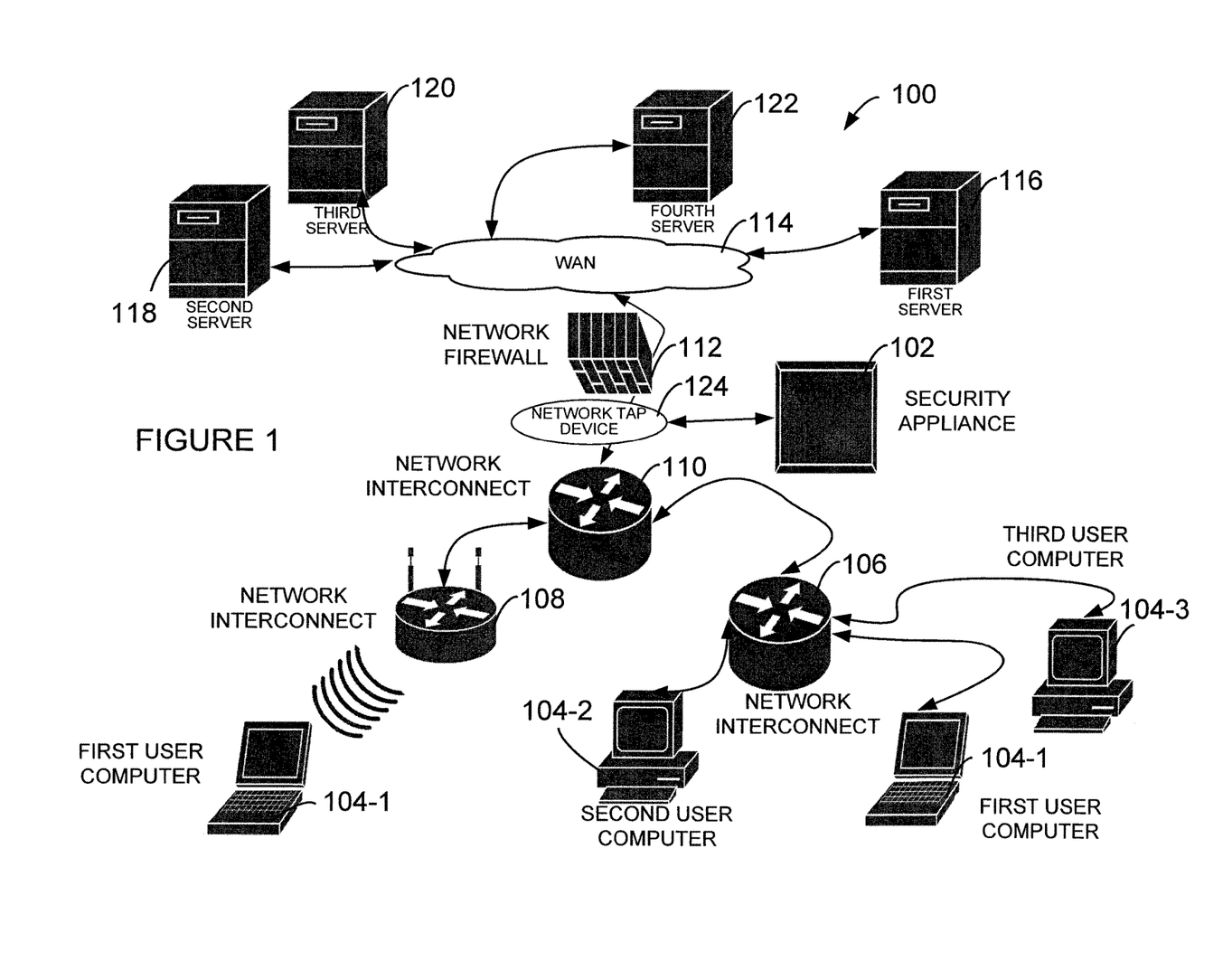
FIG. 1 shows an example computing environment with example security appliance of this disclosure, according an example of this disclosure.

FIG. 1 depicts an example computing environment 100, with a security appliance 102 of this disclosure. The computing environment 100 includes a plurality of user computers, for example, a first user computer 104-1, a second user computer 104-2 and a third user computer 104-3. The computing environment also includes a plurality of network interconnect devices 106, 108 and 110. In some examples, network interconnect device 106 may couple first user computer 104-1, second user computer 104-2 and third user computer 104-3 to form a local area network, for example, an office network. The network interconnect device 108 may be a wireless router, for example, in a conference room, that may couple one or more user computers to form another network, for example, conference room wireless network. For example, the first user computer 104-1 may also selectively couple to the network interconnect device 108, when the first user computer 104-1 is in the conference room.

The network interconnect device 110 may be configured to couple to a network firewall device 112, which may couple the network interconnect device 110 to a wide area network 114. The network interconnect device 106 and 108 may couple to network interconnect device 110 to access the wide area network 114. A plurality of servers, for example, a first server 116, a second server 118, a third server 120 and a fourth server 122 may be coupled to the wide area network 114. The plurality of servers may be accessible to the first user computer 104-1, second user computer 104-2 and the third user computer 104-3 through the network interconnect device 110.

In one example, a network tap device 124 may be disposed between the network interconnect device 110 and the firewall device 112. The network tap device 124 may be configured to intercept and forward any communication between a user computer and a server, over the wide area network 110 to the security appliance 102. Various functions and features of the security appliance 102 will now be described with reference to FIG. 2.

Figure 2:
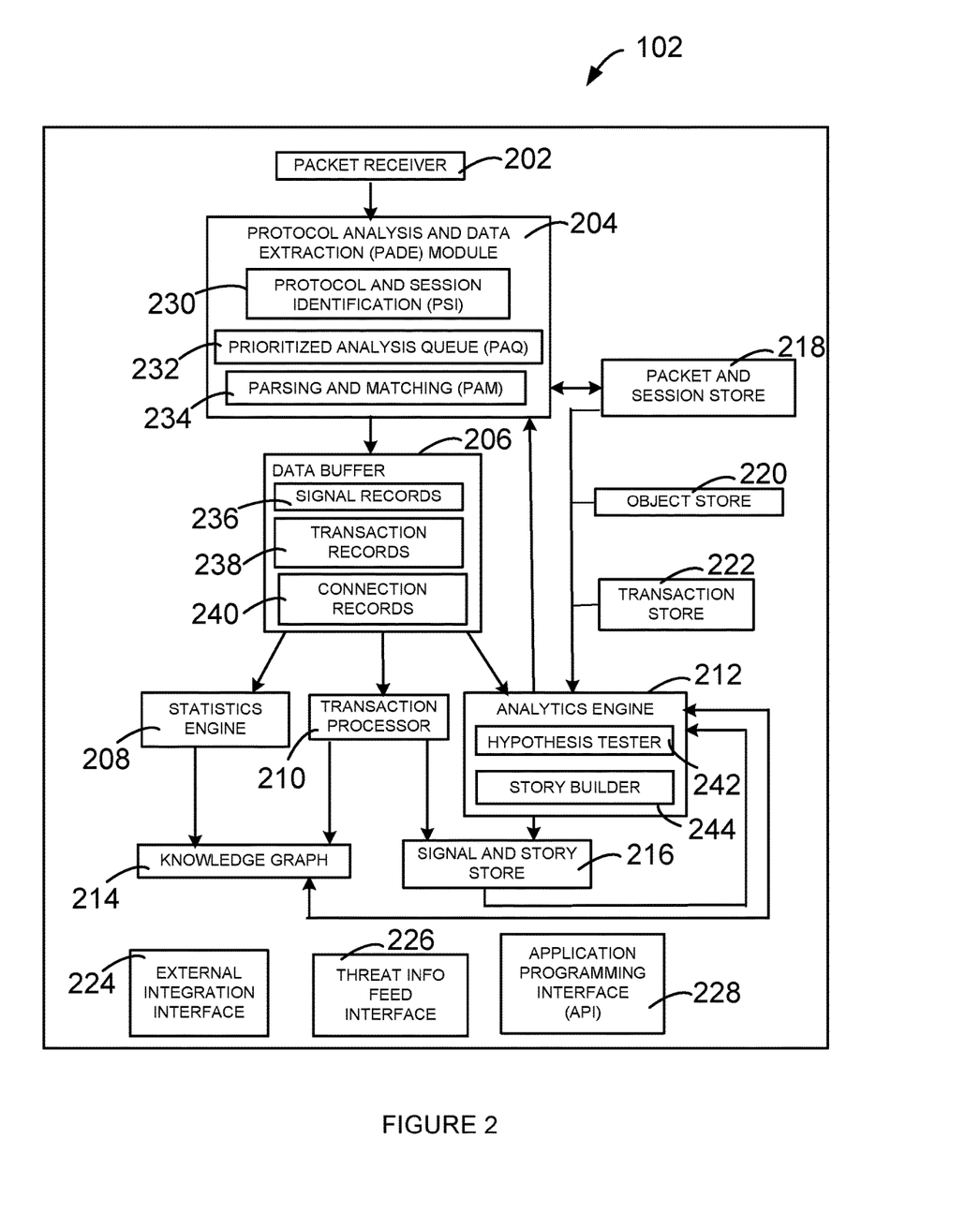
FIG. 2 depicts block diagram of an example security appliance of this disclosure.

Now, referring to FIG. 2, example security appliance 102 of this disclosure will be described. The security appliance 102 includes a packet receiver 202, a protocol analysis and data extraction module 204 (sometimes referred to as PADE module 204), a data buffer 206, a statistics engine 208, a transaction processor 210, an analytics engine 212, a knowledge graph 214, a signal and story store 216, a packet and session store 218, an object store 220 and a transaction store 222. The security appliance may additionally have an external integration interface 224, a threat info feed interface 226 and an application programming interface (API) 228. Various function and features of the security appliance 102 will now be described. Detailed operation of the security appliance 102 will be later described with reference to additional examples and figures.

The packet receiver 202 is configured to receive information from the network tap device 124. For example, packet receiver 202 may receive information related to network communication between a user computer and one or more servers, from the network tap device 124 in real time. Information related to network information may be one or more packets of information transmitted and received by the user computer. In some examples, the packet receiver 202 may be configured to receive information related to network communication between a user computer and one or more servers that might have been captured by a capture device (not shown) and stored in a data store (not shown).

The information related to network communication between a user computer and one or more servers may sometimes be referred to as packets or packet of information in this disclosure. As one skilled in the art appreciates, the packet of information may contain information encapsulated in multiple layers. Analysis and extraction of information from each layer may lead to information in subsequent layers.

The PADE module 204 includes a protocol and session identification module 230 (sometimes referred to as PSI module 230), prioritized analysis queue 232 (sometimes referred to as PAQ module 232) and parsing and matching module 234 (sometimes referred to as PAM module 234). The PADE module 204 is configured to receive packet of information. The PADE module 204 queues the received packet to be stored in the packet and session store 218. Further, the PADE module 204 queues the received packet with an initial priority for further analysis by the PAQ module 232. The PAM module 234 analyzes the received packet by parsing protocol information from the packet content for each protocol encapsulated in the packet, and matches that data with feature patterns of interest, for example, security or network visibility. Processing of the packets by the PADE module 204 is an iterative process, where one level of encapsulation is processed to determine and discover information in that protocol and the protocol of the next encapsulation.

In one example, the prioritization used for analysis of the packet is based on a probability that the packet may be associated with a threat. This prioritization may be periodically updated, as the analysis of the packet proceeds. In some situations, there may be insufficient resources available at the packet and session store 218 to store all packets that are queued for storage. In one example, the selection of packet information to write (or store) to the packet and session store 218 may be based on a value of threat probability. In some examples, the selection of packet information to store may be based on a value of threat probability at the time selection is made, rather than when the packet was queued for storage. In other words, the queue to store the packet information is prioritized based on a value of threat probability.

Once a packet has been selected for storage, raw data of the packet may be written into the packet and session store 218 in a compressed form. The packet and session store 218 may also have indexing data for the packets to facilitate retrieval of the packets based on one or more attributes. For example, the attributes for indexing may be one or more of packet timestamp, network addresses, protocol and the like. Connection information extracted and generated by the PADE module 204 from one or more packets may contain references to corresponding sessions in the packet and session store 218. In one example, connection information may be stored in the knowledge graph 214, after further processing. Connection information may correspond to a plurality of attributes like user computer, details about user of the user computer, host server, organization of the user of the user computer and the like.

The PADE module 204 based on the analysis of the packets, identifies signal records, which may sometimes be referred to as weak signals indicative of a threat, transaction records and connection records. The identified signal records 236, transaction records 238 and the connection records 240 are stored in the data buffer 206 for further processing.

The statistics engine 208 processes the connection records 240 stored in the data buffer 206 and profiles the connection information from the connection records. Connection information may be stored in the knowledge graph 214, after further processing by the statistics engine 208. Connection information may correspond to a plurality of attributes like user computer, details about user of the user computer, host server, organization of the user of the user computer and the like.

The transaction processor 210 processes the transaction records 238 and extracts transaction information from the transaction records. Extracted transaction information by the transaction processor 210 is stored in the knowledge graph 214. Selective extracted transaction information is also stored in the signal and story store 216.

The analytics engine 212 processes the signal records 236. As previously indicated, signal records 236 may indicate weak signals of an impending threat. The analytics engine 212 analyzes the signal records 236 and develops a possible story of a likely threat. The story may be a sequence of signals about user computer, activity being performed and the like. The hypothesis tester 242 evaluates one or more weak signals for a likely threat. For example, one or more threshold values may be used to evaluate a likely threat. The story builder 244 builds a possible scenario for a likely threat, based on analyzed signal records. Selective generated story and corresponding signal records may be stored in the signal and story store 216.

As one skilled in the art appreciates, the information previously stored in the signal and story store 216 may be used by the analytics engine 212 during evaluation of subsequent signal records to further update or modify a possible scenario for a likely threat. Additionally, the analytics engine 212 may use information stored in the knowledge graph 214 during evaluation of signal records and building of a story for a likely threat. The story builder 244 also uses the analyzed signal records to generate information to update priority of analysis of incoming packets by the PADE module 204.

As one skilled in the art appreciates, the data buffer 206 may store information related to signal records 236, transaction records 238 and connection records 240 on a temporary basis. One or more additional data stores may be provided to store these information for an extended period of time, for possible future use. Object store 220 is a data store to store information related to various objects. For example, in some examples, objects may be files exchanged between a user computer and destination computer. Transaction store 222 stores information related to transaction, for example, for an extended period of time.

External integration interface 224 may provide an interface to communicate with other appliances, for example, other security appliances. Threat info feed interface 226 may provide an interface to communicate with external threat information feeds. These external threat information feed may be used by the security appliance 102 during various stages on analysis and story building. Application programming interface 228 may provide interface to one or more applications. For example, application programming interface 228 may provide an interface to an user interface application to permit a user to interact with the security appliance 102.

Figure 3:
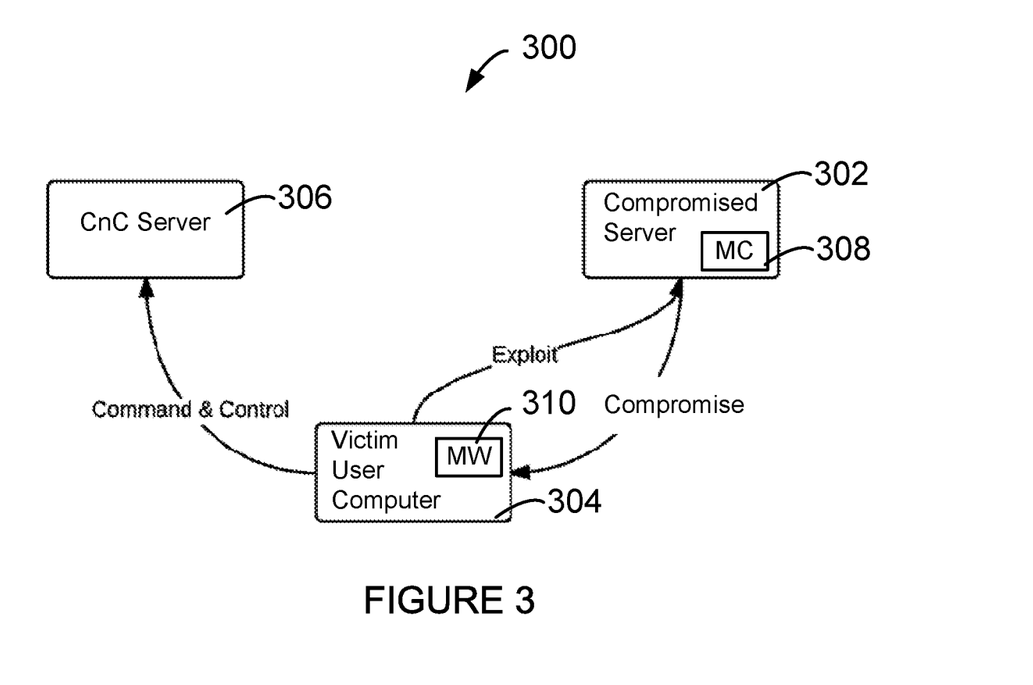
FIG. 3 shows various phases of an example malicious attack in an example computing environment.

Having described an example security appliance 102 of this disclosure, now referring to FIG. 3, flow diagram 300 shows various phases of an example malicious attack. FIG. 3 shows a compromised server 302, a victim user computer 304 and a command and control server 306 (sometimes referred to as a CnC server 306). In some examples, the victim user computer 304 may correspond to one of the first user computer 104-1, second user computer 104-2 and third user computer 104-3 described with reference to FIG. 1. In some examples, the compromised server 302 may correspond to first server 116 described with reference to FIG. 1. In some examples, the CnC server 306 may correspond to one or more of the second server 118, third server 120 and fourth server 122 described with reference to FIG. 1.

In general, a hacker compromises an external website running on a server the victim user computer 304 visits regularly, and injects malicious content 308 (sometimes referred to as malicious code 308) into the website. For example, the malicious content 308 may be present on the compromised server 302. When a user from the victim user computer 304 visits the website on the compromised server 302, the malicious code 308 may be executed. In some examples, the malicious code 308 may be an executable JavaScript. This phase may sometimes referred to as an exploit phase. In some examples, the malicious code 308 may load a malware 310 on to the victim user computer 304.

The malware 310 loaded on to the victim user computer 304 may be an executable code. This phase may sometimes be referred to as a compromise phase. The malware executable code may then connect to the CnC server 306 and waits for commands from the CnC server 306 to be executed on the victim user computer 304. This phase may sometimes referred to as command and control phase.

Having described various phases of likely malicious attack and general operation of the security appliance 102, an example evaluation of various security entities in a computing environment will now be described. The security entities in one example, may be computing devices in the computing environment, for example, first user computer 104-1, second user computer 104-2, third user computer 104-3, first server 116, second server 118, third server 120, and fourth server 122. In some examples, the security entity may be the first user, second user and the third user. In some examples, it may be accounts used by the first user, second user and the third user. In some examples, the security entity may be an application executed on a computing device. For example, a mail application, a web browser application and the like. In some examples, the security entity may be a group of users belonging to a specific group or an organization.

Figure 4:
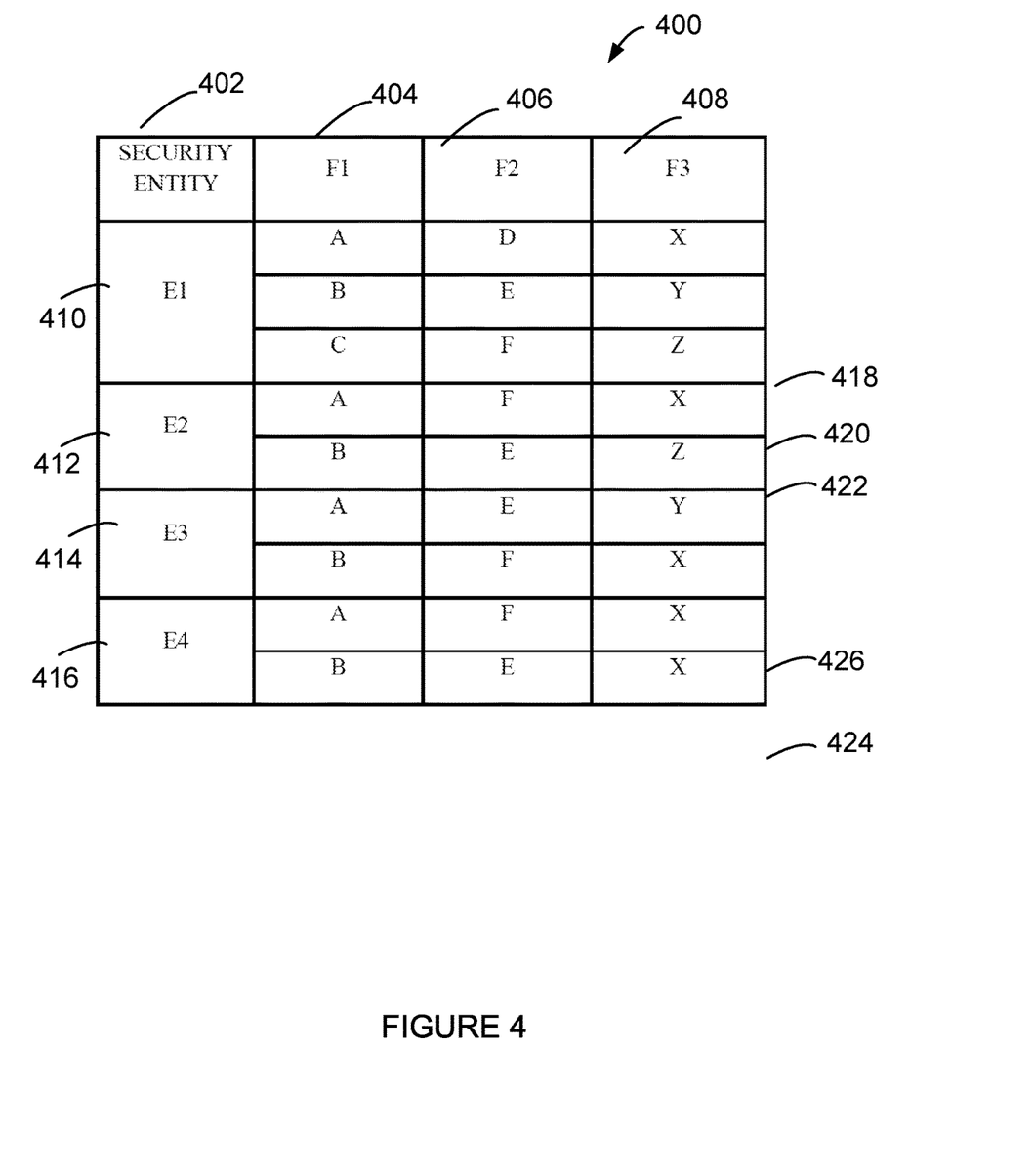
FIG. 4 shows an example table with various values for a plurality of attributes observed for a plurality of security entities.

Now, referring to FIG. 4, table 400 shows a plurality of security entities, with associated attributes. For example, referring to column 402, various security entities E1 to E4 are shown. Referring to column 404, various values for attribute F1, for each of the security entity is shown. For example, we notice values A, B and C for the attribute F1. Similarly, referring to column 406, various values for attribute F2, for each of the security entity is shown. For example, we notice values D, E and F for the attribute F2. Similarly, referring to column 408, various values for attribute F3, for each of the security entity is shown. For example, we notice values X, Y and Z for the attribute F3.

Now, referring to row 410, various values for attributes F1, F2 and F3 for security entity E1 at various times is shown. Similarly, referring to row 412, various values for attributes F1, F2 and F3 for security entity E2 observed at various times is shown. Similarly, referring to row 414, various values for attributes F1, F2 and F3 for security entity E3 observed at various times is shown. Similarly, referring to row 416, various values for attributes F1, F2 and F3 for security entity observed at various times is shown. As one skilled in the art appreciates, the values for various attributes corresponding to a security entity is extracted from analyzing various network communication between a user computer and a destination computer by the security appliance.

The number of entries in an enterprise may be of the order of {please provide a sizing number or range}. However, for ease of explanation of various inventive features of this disclosure, an example table 400 is shown with a limited number of security entities and a limited number of attributes.

Figure 4A:
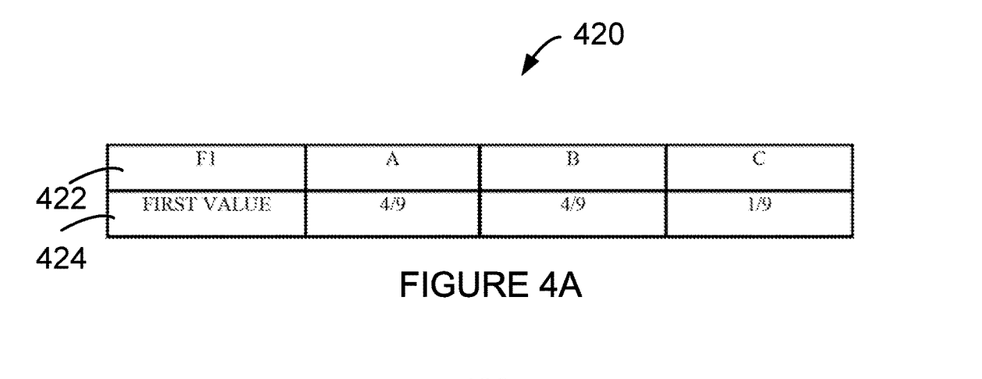
FIG. 4A to FIG. 4C shows example tables with a first value for the plurality of attributes shown in table of FIG. 4.

Now, based on the information stored in table 400, a first value indicative of occurrence of each of the values for each of the attributes is generated. Now, referring to FIG. 4A, table 420 shows various calculated first values for each of the attributes for attribute F1. For example, referring to row 422, various values for attribute F1 is shown. As one skilled in the art appreciates, referring back to FIG. 4, column 404, there are nine entries with one of the possible attribute values of A, B, and C for attribute F1. Attribute value of A occurs four times out of nine times, attribute value of B occurs four times out of nine times and attribute value of C occurs one time out of nine times. In other words, first value for attribute value of A is 4/9, attribute value of B is 4/9 and attribute value of C is 1/9. Now, referring to FIG. 4A, row 424, corresponding first value for each of the attribute value is shown.

Figure 4B:
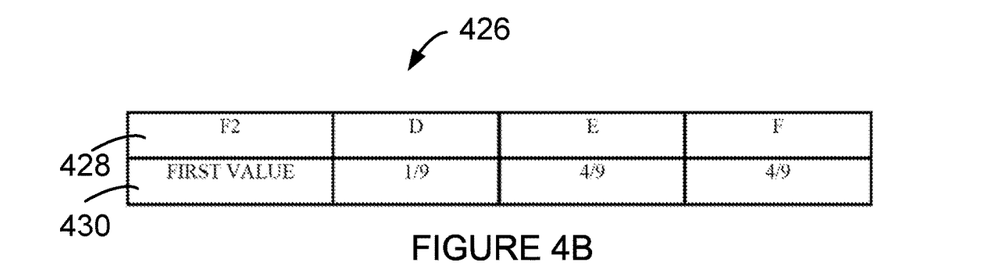

Now, referring to FIG. 4B, table 426 shows various calculated first values for each of the attributes for attribute F2. For example, referring to row 428, various values for attribute F2 is shown. Now, referring to row 430, corresponding first value for each of the attribute value is shown. As an example, first value for attribute value of D is 1/9, attribute value of E is 4/9 and attribute value of F is 4/9.

Figure 4C:
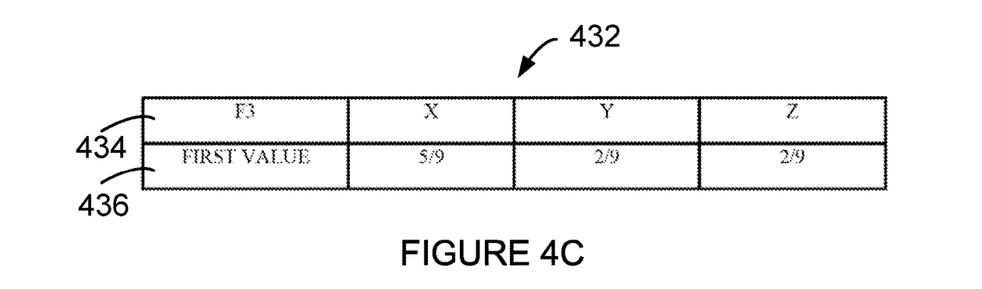

Now, referring to FIG. 4C, table 432 shows various calculated first values for each of the attribute values for attribute F3. For example, referring to row 434, various values for attribute F3 is shown. Now, referring to row 436, corresponding first value for each of the attribute value is shown. As an example, first value for attribute value of X is 5/9, attribute value of Y is 2/9 and attribute value of Z is 2/9.

Now, a second value indicative of occurrence of each of the values for each of the attribute for each of the security entity is calculated. For example, referring to FIG. 4, table 440 shows calculated second value for each of values for each of the attribute for each of the entities. Now, referring back to FIG. 4, table 400, row 401, we notice that for security entity E1, three attribute values (A, B, C) occurred or observed for attribute F1. So, each of the values A, B and C occurred one time out of three times, in other words, 1/3 times. So, the second value for security entity E1 for attribute value of A is 1/3, attribute value of B is 1/3 and attribute value of C is 1/3.

Now, referring back to FIG. 4D, table 440, row 442 and column 444, we notice the second value for security entity E1 for each of the attribute values of A, B and C. As another example, referring to cell 446, we notice that the second value for security entity E4 for attribute value of C is zero, as attribute value of C was never observed for security entity E4, as shown in table 400 of FIG. 4.

Having calculated the first value and second value for each of the attribute values, a third value is calculated based on the first value and the second value for each of the attribute value for each of the security entity. In one example, the third value is indicative of significance of the value of the attribute for the security entity. In one example, the third value is calculated using a formula, if second value is greater than the first value, then, third value is equal (second value−first value)* (second value/first value) otherwise equal to zero. This equation may be referred to as Equation 1.

Figure 4D:
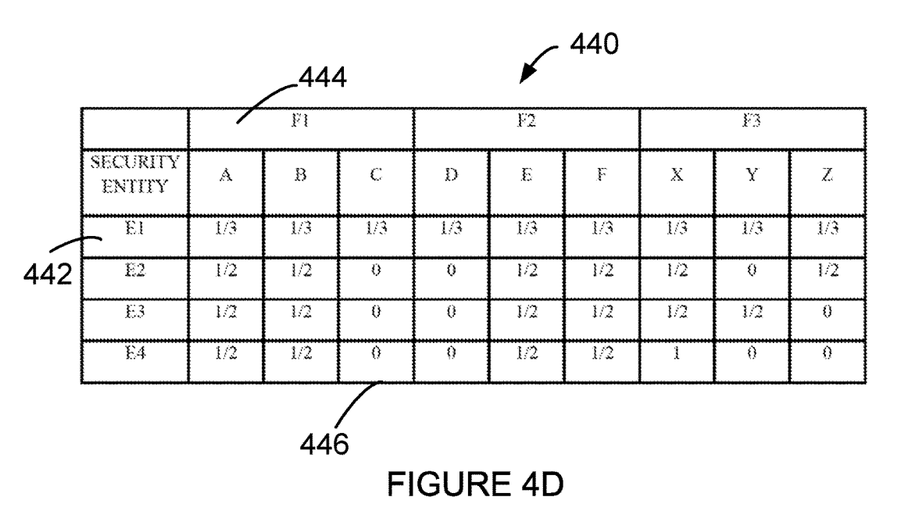
FIG. 4D shows example table with a second value for the plurality of attributes shown in table of FIG. 4.
Figure 4E:
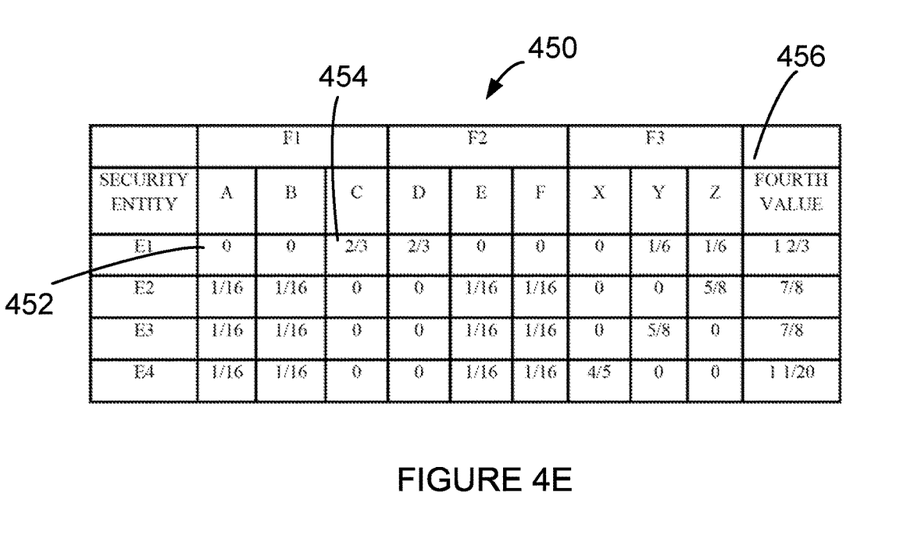
FIG. 4E shows example table with a third value for the plurality of attributes shown in table of FIG. 4.

Now, referring to FIG. 4E, example table 450 shows the third value for each of the attribute value for each of the security entity. As an example, the first value for attribute value of A is 4/9 (see FIG. 4A, table 420) and the second value for attribute value of A for the security entity E1 is 1/3 (see FIG. 4D, table 440). Now, using Equation 1, we notice that the third value is zero, as the second value is less than the first value, for attribute value of A for security entity E1. This third value is depicted in cell 452 of FIG. 4E, table 450.

As another example, the first value for attribute value of C is 1/9 (see FIG. 4A, table 420) and the second value for attribute value of C for the security entity E1 is 1/3 (See FIG. 4D, table 440). Now, using Equation 1, we notice that the third value is not zero, as the second value is greater than the first value, for attribute value of C for security entity E1. Substituting the value of 1/9 for the first value and 1/3 for the second value in Equation 1, we derive a third value of 2/3 for the attribute value of C for security entity E1. This third value is depicted in cell 454 of FIG. 4E, table 550. By using various values of the first value and the second value for each of the attribute values for each of the security entity, corresponding third value is derived.

Now, a fourth value is generated for each of the security entity, based on the third value for all of the attribute values for each of the security entity. In one example, all the third values for the security entity are summed to derive the fourth value for the security entity. Now, referring to FIG. 4E, table 450, column 456 shows the fourth value for each of the security entities E1 to E4. For example, the fourth value for security entity E1 is 5/3, security entity E2 is 7/8, security entity E3 is ** and security entity E4 is 1 1/20.

Now, evaluating various third values and fourth values, one or more observations can be made. In one example, the third value (security entity, attribute value) may be compared. For example, a high third value for a security entity and attribute value combination may indicate a possible combination of interest for further analysis. In other words, referring to table 450, there are two combinations with a high third value of 2/3. For example, third value (E1, F1=C)=2/3 and third value (E1, F2=D)=2/3. When compared with other attribute values, we notice that attribute values of C and D only appear with reference to security entity E1, and not in other entities. This indicates a significant deviation from other security entity attribute values for the specific attribute F1 and F2. In one example, Security entity E1 with attribute values of C and D may be selected for further security investigation.

As one skilled in the art appreciates, in some examples, for security entity E1 with attribute values of C and D may indicate a malware activity, as there is a significant deviation from other security entity attribute values. In some examples, attribute values of C and D may indicate a mutated or uncommon signatures that may look visually normal for a human investigator, but may in fact indicate a likely malware activity.

As another example, the combination with a second highest third value of 4/5 is seen for security entity E4 for an attribute value of X for attribute F3. When compared with other attribute values for attribute F3, we notice that security entity E4 has only the attribute value of X amongst all of the possible attribute values for attribute F3. This indicates a significant deviation from other security entity attribute values for the specific attribute F3. In one example, Security entity E4 with attribute value of X may be selected for further security investigation.

As yet another example, evaluating the fourth value for each of the security entity, we notice that a fourth value of 1⅔ for security entity E1, being the highest fourth value indicates that security entity E1 may be a likely candidate for further security investigation. And, security entity E4 with a fourth value of 1 1/20, being the second highest fourth value indicates that security entity E4 may be a likely candidate for further security investigation. In some examples, a threshold value for the fourth value may be set and any security entity with a fourth value greater than the threshold value may be selected for further security investigation. As an example, if a threshold value of 1 is set for the fourth value, then, based on the threshold value, the security entity E1 and E4 will be selected for further security analysis.

In some examples, it may be desirable to determine similarity between a plurality of security entities. In some examples, the third value for each of the attribute value and security entity combination may be evaluated to determine similarity between a plurality of security entities. Now, referring to FIG. 5A, an example table 500 is shown, with third value for each of the security entities E5, E6 and E7, for attribute values of G and H for attribute F1 and attribute values of J and K for attribute F2. For example, the third value (E5, F1=G) is 77, as shown in cell 502. Similarly, the third value (E7, F2=K) is 19 as shown in cell 504.

Figure 5A:
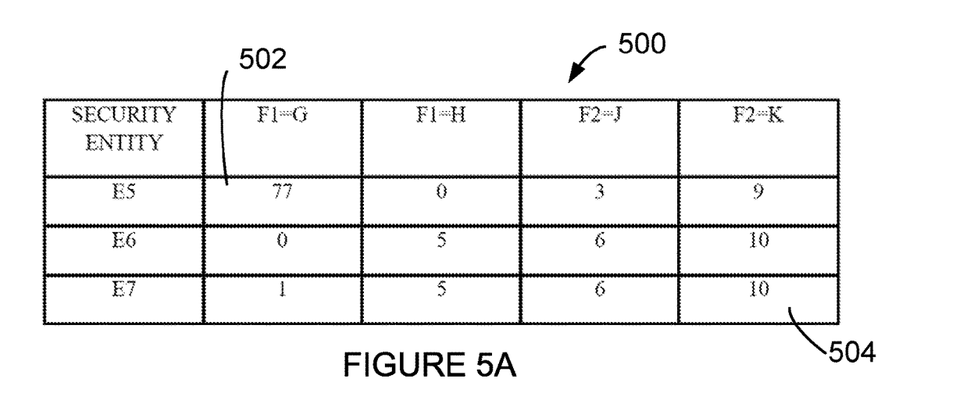
FIG. 5A shows another table with a third value for a plurality of attributes, for a plurality of security entities.
Figure 5B:
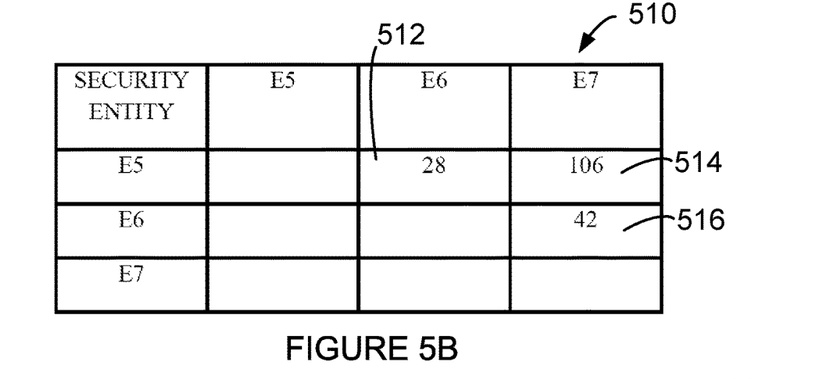
FIG. 5B shows an example similarity matrix between plurality of security entities of FIG. 5A.

Now, referring to FIG. 5B, an example similarity matrix 510 is shown, with a fifth value indicative of similarity between a pair of security entities. The fifth value for a given security entity pair is calculated by adding third values of each of the attribute values for the security entity in the pair, provided the attribute value is a non-zero value. In other words, a given attribute value was present in both the security entities in the pair. Now, referring back to FIG. 5A, table 500, the fifth value for security entity pair E5 and E6 is 0+0+(3+6)+(9+10)=28. First zero in this calculation is because of a third value=0 for security entity E6 for attribute value of G for attribute F1. The second zero in this calculation is because of a third value=0 for security entity E5 for attribute value of H for attribute F1. The fifth value for security entity pair E5 and E7 is (77+1)+0+(3+6)+(9+10) =106. Similarly, the fifth value for the security entity pair E6 and E7 is 0+(5+5)+(6+6)+(10+10)=42. The fifth value for the security entity pairs E5 and E6 is 28 and shown in cell 512 of FIG. 5B, table 510. Similarly, the fifth value for security entity pair E5 and E7 is 106 and shown in cell 514. And, the fifth value for security entity pair E6 and E7 is 42 and shown in cell 516.

Figure 5C:
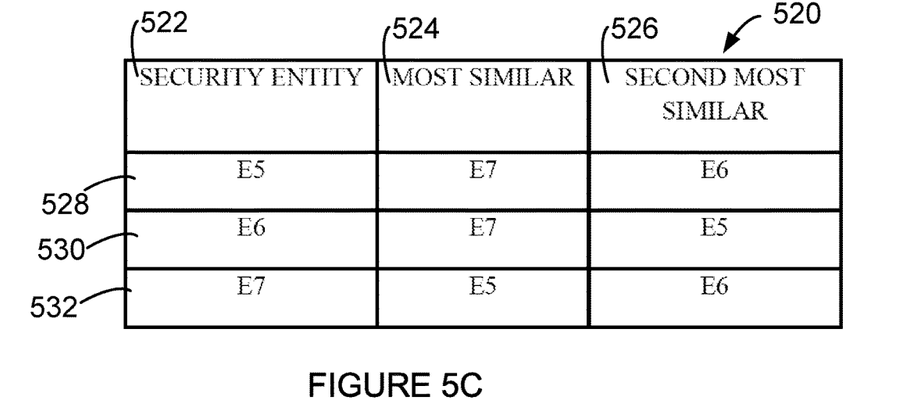
FIG. 5C shows an example prioritized similarity matrix between plurality of security entities of FIG. 5A.

As one skilled in the art appreciates, example similarity matrix shown in FIG. 5B may be a matrix with N×N cells, for N number of security entities. In an enterprise, there might be 100's of thousand security entities. In some examples, it may be desirable to generate a smaller matrix showing a subset of security entity pairs that are most similar. In some examples, this smaller matrix may be referred to as a prioritized similarity matrix. An example prioritized similarity matrix 520 is shown in FIG. 5C.

Now, referring to matrix 520, we notice that column 522 shows security entities, column 524 shows corresponding most similar security entity in the pair of security entities and column 526 shows second most similar security entity in the pair of security entities. In one example, the number of security entities will correspond to N and significance of similarity corresponds to T, which in this example is two (here, most similar and second most similar). As one skilled in the art appreciates, T may have a value less than N and preferably in the order of ten in some examples. As previously indicated, N may be of the order of 100's of thousands in an enterprise.

Now, referring to row 528, we notice that security entity pair E5 and E7 are most similar, based on a fifth value of 106. In this example, for the security entity E5, a significantly elevated third value of 77 for attribute value of G for attribute F1 will increase the fifth value for any other security entity in the pair, provided those security entities also have a non-zero third value for attribute value of G for attribute F1. Also, the security entity pair E5 and E6 are second most similar, based on a fifth value of 28. Now, referring to row 530, we notice that security entity pair E6 and E7 are most similar, based on a fifth value of 42. In this example, both security entities E6 and E7 have similar low third value, except for one zero third value. So, they end up getting classified as most similar pair.

As one skilled in the art appreciates, by reviewing the prioritized similarity matrix, one or more security entity pairs may be considered similar and any security investigation of one of the security entity in the pair may lead to further investigation of another one of the security entity in the pair.

In some examples, it may be desirable to review the behavior of various security entities over time. For example, comparing the behavior of the security entities based on two different time periods may indicate possible deviation in the behavior of the security entities. This may be advantageously performed by comparing third values for a security entity generated based on activities during two different time periods. Now, referring to FIGS. 6A and 6B, example table 600 showing third values for a first time period and table 620 showing third values for a second time period is described.

Figure 6A:
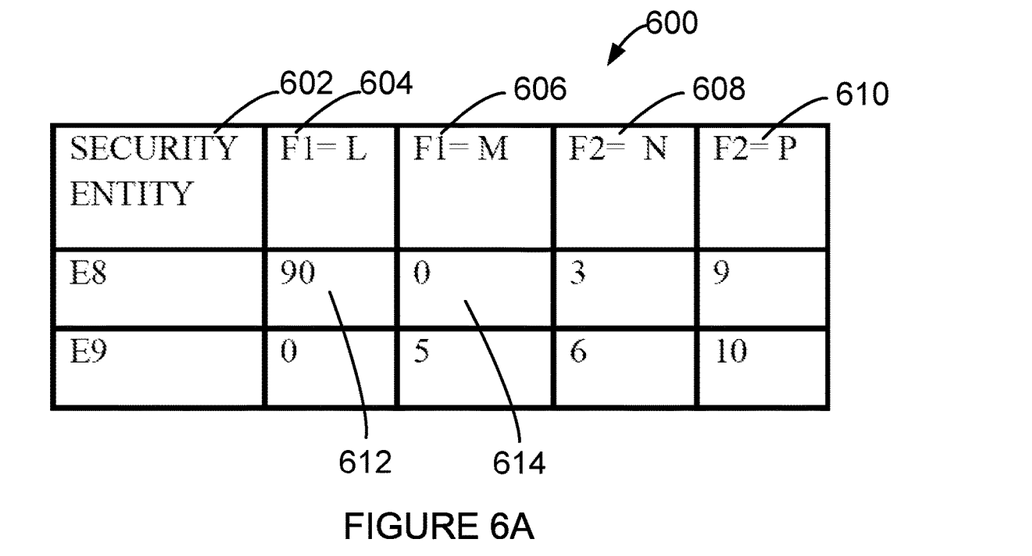
FIG. 6A shows yet another table with a third value for a plurality of attributes for a first time period.

Referring to FIG. 6A, table 600 shows third value for a first time period. For example, column 602 shows security entities E8 and E9. The third value for attribute F1 with an attribute value of L and M in shown in column 604 and 606 respectively. The third value for attribute F2 with an attribute value of N and P is shown in column 608 and 610 respectively. For example, the third value (E8, F1=L) is 90, as shown in cell 612. The third value (E8, F1=M) is 0, as shown in cell 614.

Figure 6B:
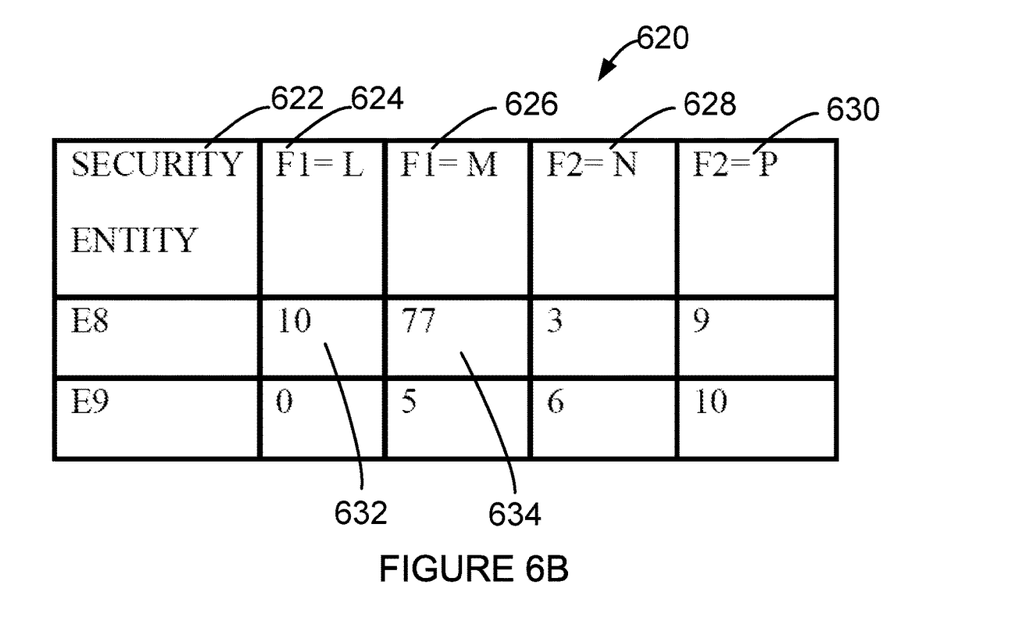
FIG. 6B shows yet another table with a third value for a plurality of attributes for a second time period.

Now, referring to FIG. 6B, table 620 shows the third value for a second time period. For example, column 622 shows security entities E8 and E9. The third value for attribute F1 with an attribute value of L and M in shown in column 624 and 626 respectively. The third value for attribute F2 with an attribute value of N and P is shown in column 628 and 630 respectively. For example, the third value (E8, F1=L) is 10, as shown in cell 632. The third value (E8, F1=M) is 77, as shown in cell 634.

Now, comparing the table 600 and 620, we notice that for security entity E8, the third value (E8, F1=L) changed from a value of 90 (as shown in cell 612) to a value of 10 (as shown in cell 632). Also, we notice that the third value (E8, F1=M) changed from a value of 0 (as shown in cell 614) to a value of 77 (as shown in cell 634). However, all the other third values for security entities E8 and E9 remained about the same during both the first time period and the second time period. The deviation in the third value for one or more third values for security entity E8 may indicate that a significant change has occurred in the behavior of the security entity E8. This deviation may trigger a possible security investigation of the security entity E8.

On the other hand, the third value for security entity E9 has substantially remained same for all of the attributes for both the first time period and the second time period. This may indicate that no significant change has occurred in the behavior of the security entity E9. As one skilled in the art appreciates, a threshold value for deviation in the third value between a first time period and a second time period may be established to selectively select one or more security entities for further security investigation.

Based on the evaluation of the third values, fourth values and the fifth values, in one example, the security appliance 102 may trigger a message to a user to indicate that one or more security entity has been selective identified for further security investigation. The user may further investigate the behavior of the selected security entity for possible corrective action.

As one skilled in the art appreciates, security entities may be data, network, organization, device, persona (or user attributes) and application. In one example, the security entities are entities that may have attributes that may be directly or indirectly relevant from a security or threat analysis perspective. The security appliance 102 selectively extracts information from communication between two computing devices and builds one or more tables and matrices of useful information, for example, various tables and matrix described in this disclosure.

Figure 7:
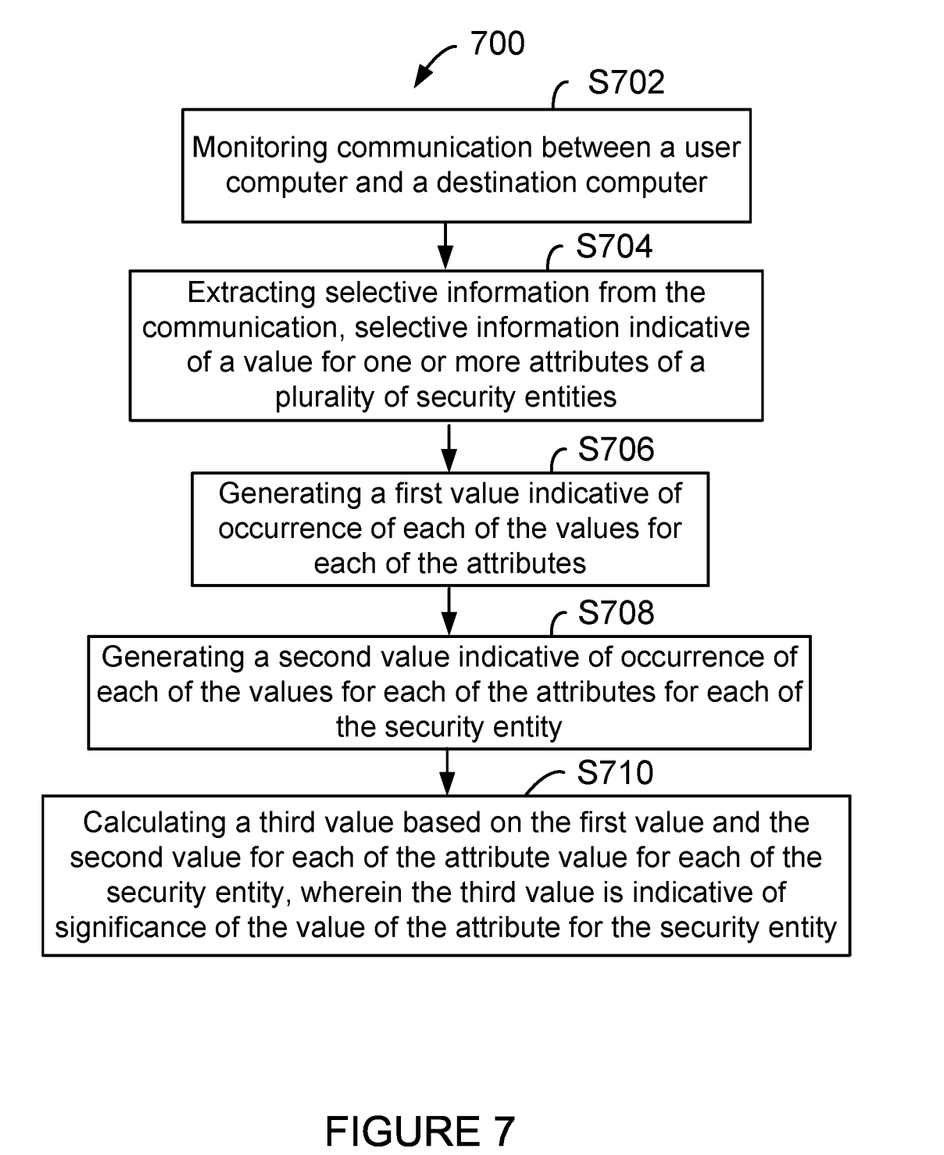
FIG. 7 shows an example flow diagram to evaluate various security entities in a computing environment, according to an example of this disclosure.

Now, referring to FIG. 7 an example flow diagram 700 is described. In block S702, communication between a user computer and a destination computer is monitored. For example, the user computer may be the victim user computer 304 and the destination computer may be a compromised server 302 as described with reference to FIG. 3. In some examples, the user computer may be one or more of the user computers, for example, first user computer 104-1, second user computer 104-2 and third user computer 104-3 as shown and described with reference to FIG. 1. In some examples, the destination computing device may be one or more the servers, for example, first server 116, second server 118, third server 120 and the fourth server 112 as shown and described with reference to FIG. 1.

In block S704, selective information from the communication is extracted. For example, as described with reference to security appliance 102 of FIG. 2 selective information from the packets are extracted. In one example, the extracted selective information is indicative of a value for one or more attributes of a plurality of security entities. As an example, the extracted selective information may be stored in a table similar to table 400 described with reference to FIG. 4.

In block S706, a first value indicative of occurrence of each of the values for each of the attributes is generated. For example, as described with reference to FIGS. 4A-4C, first value is generated and stored in tables 420, 426 and 436. In some examples, the analytics engine 212 of the security appliance 102 may be configured to generate the first value. In some examples, the analytics engine 212 may include a processor engine (not shown) to perform various arithmetic and logical calculations required to generate the first value.

In block S708, a second value indicative of occurrence of each of the values for each of the attributes for each of the security entity is generated. For example, as described with reference to FIG. 4D, second value is generated and stored in table 440. In some examples, the analytics engine 212 of the security appliance 102 may be configured to generate the second value. In some examples, the analytics engine 212 may include a processor engine (not shown) to perform various arithmetic and logical calculations required to generate the second value.

In block S710, a third value is calculated based on the first value and the second value for each of the attribute value for each of the security entity. The third value is indicative of significance of the value of the attribute for the security entity. For example, as described with reference to FIG. 4E, third value is calculated and stored in table 450. In some examples, the analytics engine 212 of the security appliance 102 may be configured to generate the third value. In some examples, the analytics engine 212 may include a processor engine (not shown) to perform various arithmetic and logical calculations required to calculate the third value.

In some examples, a fourth value is calculated for each of the security entity based on the third value for all of the values of the attributes for each of the security entity. In some examples, the fourth value is calculated for each of the security entity based on the third value for a subset of values of the attributes for each of the security entity. In some examples, the subset of values of the attribute are selected based on the values of the attribute below a threshold value of occurrence in the security entity.

In some examples, the analytics engine 212 of the security appliance 102 may be configured to generate the fourth value. In some examples, the analytics engine 212 may include a processor engine (not shown) to perform various arithmetic and logical calculations required to calculate the fourth value. In some examples, the fourth value of a selected one of the plurality of security entity is compared to a threshold value. If the fourth value of the selected one of the plurality of security entity is above the threshold value, the selected one of the plurality of security entity is selected for security investigation.

In some examples, a similarity matrix is generated for the plurality of security entities based on the third value, for example, as described with reference to FIGS. 5A and 5B. In some examples, a prioritized similarity matrix is developed as described with reference to FIG. 5C. In some examples, a plurality of third values for the plurality of security entities based on a plurality of time intervals are generated. At least one of the security entity is identified for security investigation based on a deviation in the plurality of third values, for example, as described with reference to FIGS. 6A and 6B.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for evaluating a plurality of security entities in a network environment, comprising:
monitoring a communication between a user computer and at least one destination computer by a security appliance executed on a computing device;
extracting selective information from the communication by the security appliance, selective information indicative of a value for each of the one or more attributes of the plurality of security entities, extracted selective information stored in a data store;
generating a first value indicative of occurrence of each of the value for each of the attribute based on a total number of values associated with each of the attribute for the plurality of security entities;
generating a second value indicative of a ratio of number of occurrence of each of the value to a total number of distinct values observed for each of the attribute for each of the security entity;
calculating a third value for each of the attribute value for each of the security entity, based on the first value generated based on the total number of values associated with each of the attribute for the plurality of security entities and the second value for each of the attribute value for each of the security entity based on the total number of distinct values observed for each of the attribute of each of the security entity, wherein the third value is equal to a product of the ratio of the second value over the first value multiplied by the difference between the second value and the first value, when the second value is greater than the first value, wherein the third value is indicative of a significance of the value of the attribute for each of the security entity;
generating a plurality of third values for the plurality of the security entities based on a plurality of time intervals; and
selectively identifying at least one of the plurality of security entities for security investigation based on a deviation in the generated plurality of third values.

2. The method of claim 1, further including generating a fourth value for each of the security entity based on a summation of all the third values for all of the values of the attribute for the corresponding each of the security entity.

3. The method of claim 2, further including comparing the fourth value of a selected one of the plurality of security entity to a threshold value and selecting the selected one of the plurality of security entity for security investigation when the fourth value is above the threshold value.

4. The method of claim 1, further including generating a fifth value for a pair of security entities based on the third value for each of the security entity in the pair of security entities, the fifth value indicative of a similarity between the pair of security entities.

5. The method of claim 4, wherein each of the security entity in the pair of security entities are ranked for similarity with the other security entity in the pair of security entities based on the calculated fifth value for all pairs of the security entities.

6. The method of claim 1, further including generating a fourth value for each of the security entity based on a summation of the third values for a selected subset of the values of the attribute for each of the security entity.

7. The method of claim 6, wherein the subset of the values of the attribute are selected based on the values of the attribute below a threshold value of occurrence in the security entity.

8. The method of claim 1, wherein the third value is equal to zero, when the second value is not greater than the first value.

9. A system to evaluate a plurality of security entities in a network environment, comprising:
a computing device comprising a processor and a memory;
a security appliance executed on the computing device, the security appliance configured to monitor a communication between a user computer and at least one destination computer;
extract selective information from the communication, selective information indicative of a value for each of the one or more attributes of the plurality of security entities, extracted selective information stored in a data store;
generate a first value indicative of occurrence of each of the values for each of the attribute based on a total number of values associated with each of the attribute for the plurality of security entities;
generate a second value indicative of a ratio of number of occurrence of each of the values to a total number of the distinct values observed for each of the attributes for each of the security entity;
calculate a third value for each of the attribute value for each of the security entity, based on the first value generated based on the total number of values associated with each of the attribute for the plurality of security entities and the second value for each of the attribute value for each of the security entity based on the total number of distinct values observed for each of the attribute of each of the security entity, wherein the third value is equal to a product of the ratio of the second value over the first value multiplied by the difference between the second value and the first value, when the second value is greater than the first value, wherein the third value is indicative of a significance of the value of the attribute for each of the security entity;
generate a plurality of third values for the plurality of security entities based on a plurality of time intervals; and
selectively identify at least one of the plurality of security entities for security investigation based on a deviation in the generated plurality of third values.

10. The system of claim 9, wherein the security appliance generates a fourth value for each of the security entity based on a summation of the third values for all of the values of the attribute for the corresponding each of the security entity.

11. The system of claim 10, wherein the security appliance compares the fourth value of a selected one of the plurality of security entity to a threshold value and selects the selected one of the plurality of security entity for security investigation when the fourth value is above the threshold value.

12. The system of claim 9, wherein the security appliance generates a fifth value for a pair of security entities based on the third value for each of the security entity in the pair of security entities, the fifth value indicative of a similarity between the pair of security entities.

13. The system of claim 12, wherein each of the security entity in the pair of security entities are ranked for similarity with the other security entity in the pair of security entities based on the calculated fifth value for all pairs of the security entities.

14. The system of claim 9, wherein the security appliance generates a fourth value for each of the security entity based on a summation of the third values for a selected subset of the values of the attribute for each of the security entity.

15. The system of claim 14, wherein the subset of the values of the attribute are selected based on the values of the attribute below a threshold value of occurrence in the security entity.

16. The system of claim 9, wherein the third value is equal to zero, when the second value is not greater than the first value.

* * * * *